Jan. 30, 1934.  F. MARTINDELL  1,945,493
FILM HOLDING DEVICE
Original Filed Oct. 3, 1929

Inventor:—
Frank Martindell
By John E. Gardner.
Atty.

Patented Jan. 30, 1934

UNITED STATES PATENT OFFICE 1,945,493

FILM HOLDING DEVICE

Frank Martindell, Western Springs, Ill., assignor, by mesne assignments, to Howard B. Dilkes, Wilmette, Ill.

Application October 3, 1929, Serial No. 397,112
Renewed July 21, 1933

5 Claims. (Cl. 248—39)

The present invention relates in general to vacuum chucks, and more particularly to such chucks as may be employed for holding photographic materials.

One of the objects of my invention is to provide an improved vacuum chuck that may be employed as a film holding device of light and sturdy construction.

Another object is to provide an improved vacuum chuck in which the usual supporting members may be eliminated.

Another object is to provide an improved vacuum chuck in which the air pressure which ordinarily would tend to bring about a collapse of the chuck actually to support the chuck and prevent its collapse.

A further object is to provide a vacuum chuck of light and flexible construction so that it may conform somewhat to the surface of the material that it is adapted to hold.

A still further object is to provide a novel method of constructing a vacuum chuck so that the tendency of the chuck to collapse on air pressure is counteracted by air pressure.

There are other objects of my invention which, together with the foregoing, will be described in the detailed specification which is to follow, taken in conjunction with the accompanying drawing, forming a part thereof. While my invention has been shown applied to a photographic material holder of the type shown in the co-pending application of Howard B. Dilkes, Serial No. 395,874, filed September 28, 1929, it will be understood that my improved method of constructing a vacuum chuck is of general application, and capable of a variety of uses.

In practicing my invention, I provide a metal plate having a plurality of spaced apart openings extending therethrough, and also provide a second plate of relatively flexible material shaped with a plurality of ridges therein suitably spaced apart. The two metallic plates are joined together in a convenient manner to form a hollow receptacle. A vacuum connection is made and the exhaustion of the air from the hollow interior serves to hold any article which may be placed on the surface of the plate containing the openings by air pressure. The application of air pressure to the flexible plate brings about its collapse along the hollows therein and it is forced into contact with the plate containing the openings to furnish a support for it at designated points.

With this construction of the vacuum chuck, the plate containing the openings may be somewhat flexible so that it can adapt itself to close co-operating contact with the object to be held, thereby permitting many articles or plates of uneven surface to be held by air pressure.

Referring now to the drawing.

In the drawing, like reference characters apply to similar parts throughout.

Figures 2, 3:
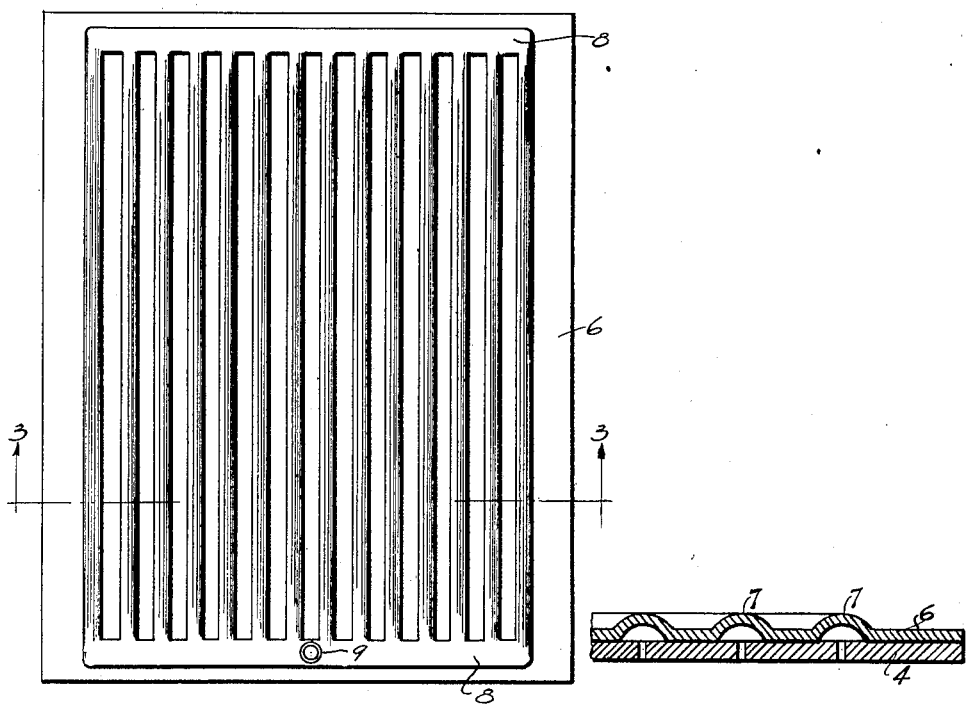
Fig. 2 is a plan view of a back thereof, illustrating the manner in which the flexible back plate may be shaped.
Fig. 3 is a partial cross-section thereof, along the line 3—3 looking in the direction of the arrows.
Figure 1:
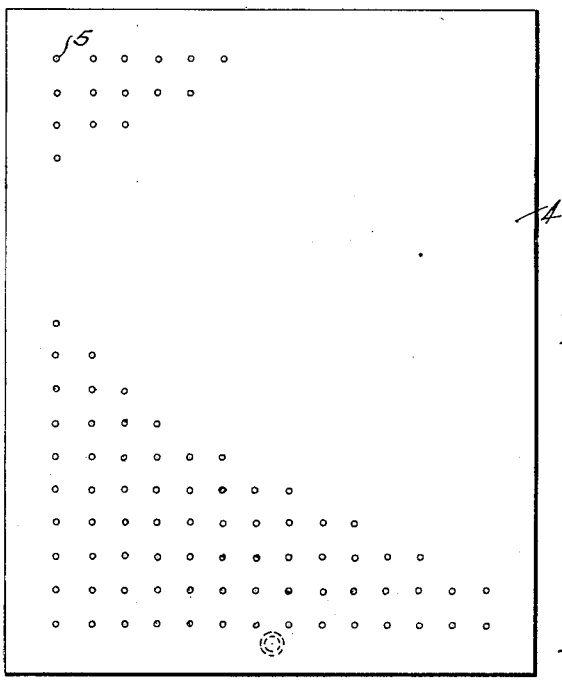
Fig. 1 is a plan view of my invention applied to a photographic material holder.

The reference character, 4, designates a flat and fairly thin rectangularly shaped metal plate, containing a plurality of small spaced apart openings, 5, therethrough forming a rectangularly shaped field or area. The outer surface of the metal plate, 4, which may be of steel or other suitable material, is ordinarily ground so as to have a substantially plane surface. I prefer to make it of metal of such character and depth as to be somewhat springy and flexible. This flexibility, as will appear, is determined by the character of work that the vacuum chuck is adapted to hold. A back plate, 6, corresponding generally in size to the front plate, 4, and formed from thin and flexible metal, such as brass, is suitably attached by sweating, soldering, or otherwise, to the back of the plate, 4, along its edges. The brass plate, 6, is provided with a plurality of spaced apart parallel ridges, 7, formed therein in any convenient or well known manner, extending substantially the length of the plate, except for a raised portion or ridge, 8, at each end, lying at right angles to the ridges, 7. It will thus be seen that the flat portions of the plate, 6, contact with the metal plate, 4, along lines spaced apart substantially throughout the whole area of the metal plate, 4. A pipe, 9, providing a vacuum connection, penetrates an opening along one of the edges, 8, into the interior of the vacuum chuck. A vacuum pump may be connected in any desired manner to this opening. The ridges, 8, serve to furnish a path for the air between the various parallel ridges, 7, in order to provide even distribution of air pressure. It will be appreciated that the vacuum chuck may be suitably lacquered or colored in any well known manner to present a finished and pleasing appearance, such as by dipping in a solution of hydrogen-sulphide.

In order to describe the manner in which my improved method of constructing a vacuum chuck functions in preventing the collapse thereof and enabling lighter construction to be employed, I shall explain its operation in holding a photographic film in a perfect plane in the same manner as the film holder described in the above mentioned co-pending application.

In this use of the vacuum chuck, the film is of slightly larger size than the rectangle formed by the openings, 5, in the plate, 4. The film is laid on the face thereof and projects a slight amount beyond the openings, 5. When the vacuum pump is started, after being connected with the outlet, 9, the air pressure within the hollow container defined by the plates, 4 and 6, is reduced and the pressure of the air forces the film into close contact with the surface of the plate, 4, thereby eliminating any tendency of the film to curl or bulge, since the air pressure is applied thereto at a plurality of closely adjacent points over the area thereof. In fact, by this construction, it is impossible to slide the film from the face of the plate, 4, by direct pull. The film holder or vacuum chuck may be mounted in the usual plate holding device of any camera, and since the film lies in a perfect plane, it may be used for the nicest kind of work in a manner superior even to a glass plate. In order to remove the film, the vacuum pump may be stopped, or by lifting both edges of the film, one or more rows of openings, 5, may be exposed to the air so that air pressure within the hollow vacuum chuck, defined by the plates, 4 and 6, may be relieved, whereupon the film may be removed readily. It is obvious that the pressure of the vacuum pump may be relieved after the film is in close contact with the surface of the plate, 4, since substantially all the openings, 5, are closed and there is no convenient access for the outside air to the hollow interior of the vacuum chuck. It will be seen that as soon as there is a reduction of air pressure within the hollow vacuum chuck, that the flexible back plate, 6, has air pressure applied to it, and since it is formed with the parallel ridges, 7, previously mentioned, the flat portions between the ridges, 7, will be forced into close contact with the metal plate, 4, thereby furnishing a support for it at a plurality of spaced apart points. By suitably forming the back plate in this manner, sufficient support may be furnished to the plate, 4, so as to prevent it changing its shape, even though it is relatively thin and flexible; that is, the pressure on the plate, 4, is equalized at certain points, which are used to furnish a support therefor. The ridges, 8, at each end of the parallel ridges, 7, serve to interconnect the openings, defined by the various hollow ridges, 7, so that the air pressure is evenly distributed over the whole face of the rectangular shaped plat, defined by the openings, 5. It will be appreciated, that it is desirable that the lines of openings, 5, in the face of the plate, 4, lie in the area of the ridges, 7, so that the air pressure will be properly applied thereto. The space between the various lines of openings, 5, is where the support is furnished to the plate, 4, by the pressure on the flexibly formed back, 6. The formation of the back plate, 6, in semi-circular shaped ridges, tends to make the ridges very strong and prevent their collapse under equal air pressure over the surface. By this method of construction, it is possible therefore to lighten the construction of a vacuum chuck very materially. In fact, I have found that the overall thickness of a vacuum chuck of this character intended for photographic work, can be less than one-fourth of an inch. Of course, the dimensions and thickness of the vacuum chuck may be varied to meet different work applications employing the same principle as herein illustrated.

A vacuum chuck of this construction is ideally adapted to hold other materials than flexible ones, such as paper and film. If we take its application in holding a metal or glass plate, which is quite rigid, it will be obvious that the pressure of the air itself will tend to bend the flexible vacuum chuck into more or less perfect contact with the plate, even though there are a number of irregularities in its surface; that is, the reduction of the air pressure first within the hollow vacuum chuck, defined by the plates, 4, and 6, will bring about a reduction of air pressure along the irregular surface with which the plate, 4, is in contact, and there will be an unequal pressure between the back and the front of the vacuum chuck, and the air pressure will cause it to conform as much as is permitted by the strength of the metal forming the vacuum chuck to the irregularities of the rigid surface of the material being held. This is an ideal construction, since it permits many articles to be held in this manner which could not be held otherwise by vacuum chucks constructed according to other methods.

From the foregoing, it will be seen that I have evolved a novel method of constructing a vacuum chuck which not only permits a simple and cheap construction, but which is a great deal lighter and more conveniently handled, and which, in addition, can be adapted to hold more or less rigid materials having somewhat of an uneven surface.

While I have illustrated and described my improved method of constructing a vacuum chuck in certain specific applications, it will be appreciated that many changes, modifications and adaptations may be made without departing from the spirit and scope of my invention as set forth in the appended claims.

I claim:

1. A vacuum chuck comprising a flat metal plate having a plurality of openings therein, a thin flexible plate attached to the first plate along its periphery and provided with a plurality of parallel ridges therein.

2. A vacuum chuck comprising a flat metal plate having a plurality of openings therein, a thin flexible plate attached to the first plate along its periphery and provided with a plurality of parallel ridges therein and a vacuum outlet extending into the hollow interior formed by said two plates.

3. A vacuum chuck comprising a flat rectangular shaped metal plate having a plurality of spaced apart openings therein, a flexible metal plate having a plurality of parallel ridges of semi-circular contours formed therein and attached to the first plate about its periphery.

4. In a vacuum chuck, a flat metallic plate having a plurality of openings therethrough and a flexible metal plate adapted to be attached to the first metal plate about its periphery, said second plate being so constructed as to brace the first metal plate, at a plurality of points upon the production of reduced air pressure in the space between said plates.

5. In a vacuum chuck, a flat semi-flexible metallic plate having a multiplicity of closely spaced openings therethrough, a flexible metal plate attached to the first plate about its periphery said flexible plate being so constructed as to brace the first metal plate at a plurality of points upon the reduction in air pressure in the space between said plates.

FRANK MARTINDELL.